Sept. 13, 1966 J. A. BURTON ETAL 3,272,351
SHEET HANDLING APPARATUS
Filed Jan. 25, 1963 6 Sheets-Sheet 1

Fig. I

INVENTORS
John A. Burton
William E. Follett
BY Corwin R. Horton
Attorney

United States Patent Office 3,272,351
Patented Sept. 13, 1966

3,272,351
SHEET HANDLING APPARATUS
John A. Burton, Vancouver, and William E. Follett, Burnaby, British Columbia, Canada, assignors to Crown Zellerbach Canada Limited, Vancouver, British Columbia, Canada, a corporation of British Columbia
Filed Jan. 25, 1963, Ser. No. 253,938
8 Claims. (Cl. 214—6)

This invention relates to apparatus for conveying and stacking sheet material. More particularly, this invention relates to apparatus for conveying and stacking sheet material wherein the sheet material is supported by creating a differentially smaller air pressure above the sheet, i.e., a vacuum.

It is well known that problems arise in conveying and stacking sheet material, particularly if it has fragile properties or if it is extremely flexible and bendable. For example, veneer (thin sheets of wood) is usually made in sheets of ⅛" thickness or less, with a width across the grain generally greater than 8" and in lengths of 6 to 10 feet. These sheets are very weak, particularly across the grain of the wood, and they are easily damaged by rough handling. Veneer is usually conveyed while it is oriented in the horizontal plane. If, when so conveyed, veneer is not supported uniformly at least in the direction across the grain as it travels, or if it is allowed to drop on to a lower support with any of the side edges pointed downwardly absorbing much of the impact, splitting along the grain of the wood is likely to occur or damage may occur to the portion absorbing the impact when the sheet strikes the support.

Stacking of veneer without dropping it as, for instance, by sliding one piece of veneer over another is not practical since the opposing surfaces are rough and since interlocking of splits in the sheets is likely to occur. A practical solution to this problem of conveying and stacking fragile or bendable sheet material, as in this example, must comprehend conveying the sheet while it is supported uniformly throughout its length in the direction of travel and dropping each sheet upon the preceding sheet on the stack from a horizontal position directly above and parallel to the stack.

Various mechanical means have been proposed for this purpose which involve mechanically supporting the sheet at its edges and moving the sheet to a position directly above the stack, whereupon the mechanical supports are removed to allow the sheet to fall onto the stack. However, these solutions have the drawback of requiring a great deal of complex apparatus and flexibility for handling sheets of varying dimensions is usually limited.

To overcome these disadvantages, various types of vacuum conveyors have been proposed in the past to independently support by a vacuum and transport each sheet until it reaches the stacking position and then to drop the sheet vertically to the top of the stack. Although generally successful, these vacuum conveyors have required relatively elaborate apparatus. The present invention contemplates and has for its primary purpose the provision of a vacuum conveyor of a simpler construction than has heretofore been devised and having a minimum of moving parts in comparison with vacuum conveyors heretofore devised. Thus, by this invention, a vacuum conveyor is provided which is inexpensive to build and easy to maintain.

It is a further object of this invention to provide a vacuum conveyor wherein the leading edge of the conveyed sheet material progressively initiates the supporting vacuum so that the entire length of the sheet moving beneath the conveyor is supported thereby. It is further contemplated to provide a vacuum conveyor wherein the sheet material is caused to move along underneath the conveyor and is held thereto by exposure on the upper side thereof to a source of low pressure over the entire surface of the conveyor adjacent to the moving sheets.

This invention further contemplates a vacuum conveyor having a vacuum plenum chamber disposed in the direction of travel, the plenum chamber opening downwardly throughout its length, and wherein the downwardly facing opening is provided with a series of closure means normally closing off the opening, which closure means are activated by the sheet material moving along the conveyor to create a series of stationary vacuum chambers above the sheet throughout the length thereof but which means close off the plenum chamber opening ahead of and behind the moving sheet.

It is further contemplated to provide a vacuum conveyor in which the moving sheet transported under the conveyor adjacent the opening to the vacuum chamber forms the bottom wall of the vacuum chamber, means being provided to seal off the vacuum chamber at the leading and trailing edges of the moving sheet during its entire travel along the conveyor. By thus confining the vacuum to those areas of the conveyor on which the material is being conveyed, vacuum blower size and power requirements are minimized.

It is further contemplated in this invention to provide novel rotating or pivoting gate members disposed below the conveyor along the conveying direction for performing the functions of (1) closing off and exposing the vacuum chamber, (2) closing off the vacuum chamber from the outside at the leading edge of the moving sheet, and (3) creating a series of adjacent stationary vacuum chambers above the moving sheet. These gate members are actuated by the leading edge of the moving sheet and are held open by the sheet. They each are biased to return to closed position by means of counterbalances or springs or the like when the moving sheet has passed therebeyond.

Automatic means are also provided, according to the present invention, activated by the moving sheet to release the vacuum in the vacuum chamber when the sheet has moved to the desired stacking position in order to release the sheet from the conveyor to drop onto the stack.

An additional object is to provide vacuum conveyor units employed in tandem so that material of exceptionally large widths may be handled and large ranges of sheet widths may be accommodated with practically no change of design.

Another object is to provide a stack receiving platform which is vertically adjustable either automatically or by an operator to maintain the top of the stack within a preselected distance of the bottom of the vacuum conveyor so that the sheets always have only a short distance to fall from the conveyor to the stack, thereby making the stack more uniform and preventing impact damage to the sheets.

These and other objects and advantages of the invention will be apparent from a consideration of the conveyor apparatus which is shown by way of illustration in the accompanying drawings wherein.

While of course not being limited thereto, use of the present invention is peculiarly suited for conveying sheets of veneer and the following description of the invention relates, by way of example, to a vacuum conveyor used for handling and stacking sheets of veneer.

Figure 2:
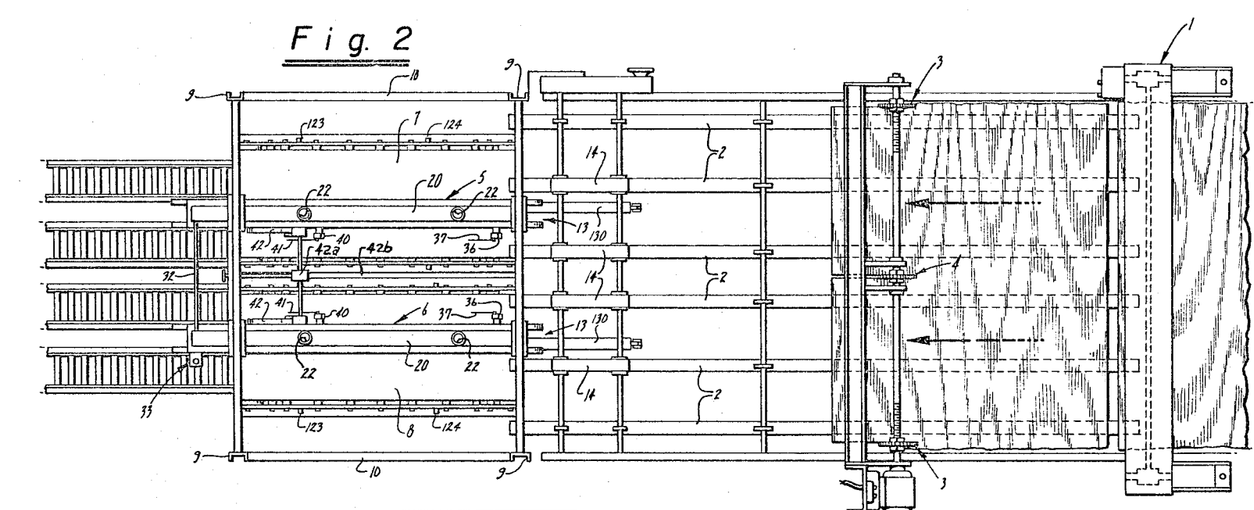
FIGURE 2 is a plan view of the sheet handling apparatus of FIG. 1 in operating position for handling sheets of veneer showing the sheet handling apparatus in position for receiving clipped and trimmed veneer from the veneer clipper and trimmer which are also shown in plan view.

Referring first to FIG. 2, there is illustrated at the far right a veneer clipper 1 into which veneer cut from logs usually by means of a rotary lathe is fed from the right with the grain perpendicular to the direction of travel. These veneer sheets may range from a thickness of $1/10$ inch to $3/8$ inch thick but usually vary from $1/40$ inch to $5/16$ inch thick. The veneer sheets supplied are generally in lengths along the grain of 6 to 10 feet.

As the clipper comprises no essential feature of the invention, suffice it to say that this apparatus cuts the sheets of veneer into standard widths across the grain as the sheets are caused to travel therethrough with the grain of the wood perpendicular to the direction of travel.

From the clipper the veneer is discharged onto a feed conveyor comprising a series of belts 2 which carry the clipped veneer sheets underneath the trimmer and central cutting saws. Trimmer saws 3 trim the outside of the veneer sheet to a uniform length and central cutting saw 4 cuts the veneer sheets into two sheets of equal length. The conveyor then carries the two separated sheets to two vacuum conveyors arranged in tandem designated 5 and 6 where they each are picked up under one of conveyors 5 and 6 which carry them to a position above the forming stacks of sheets 7 and 8 and drop them on stacks 7 or 8.

General description of conveyors

Figure 1:
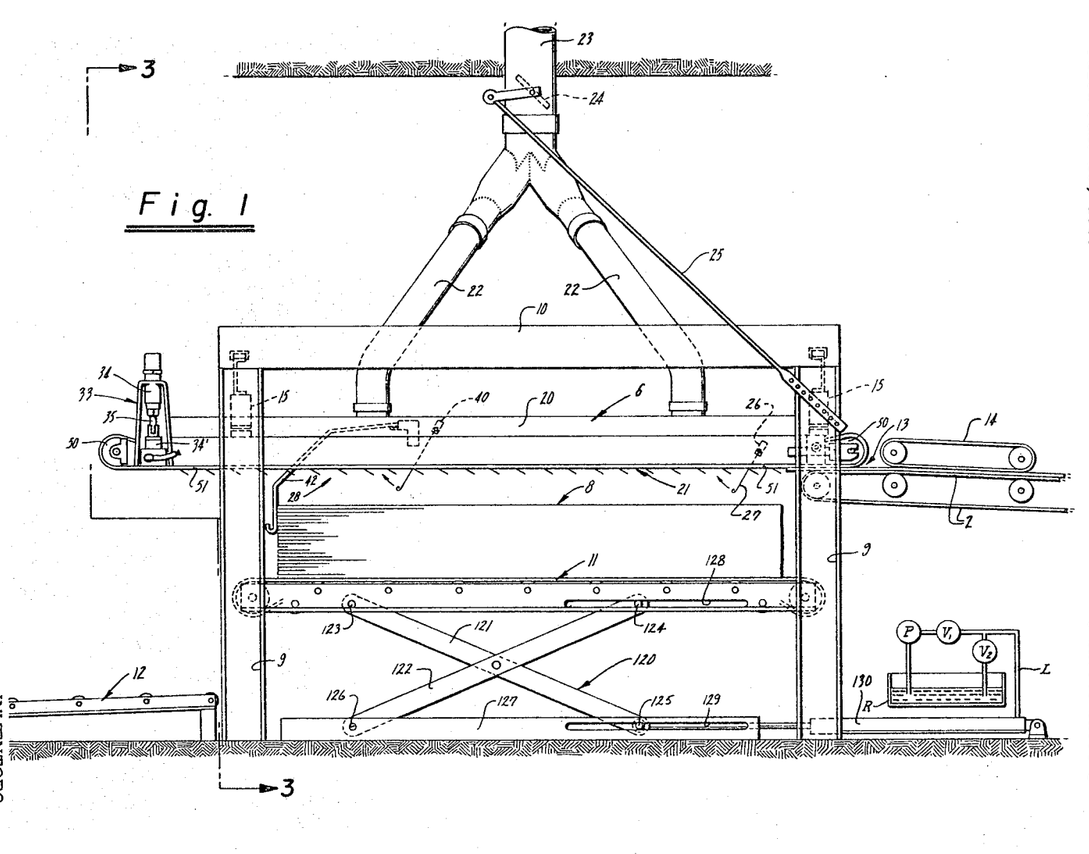
FIGURE 1 is a side elevation of a sheet handling apparatus which embodies therein the principal features of the invention.

Referring now to FIG. 1, the vacuum conveyors are seen in side elevation (conveyor 5 being hidden from view) immovably suspended horizontally by hangers 15 which are in turn supported by means of rectangular arr framework consisting of uprights 9 and overhead beams 10. At the bottom of this framework, adjacent the floor below the conveyors intermittent conveyors 11 are provided upon which rest the stacks of veneer 7 and 8 formed by operation of the vacuum conveyors. When the stacks of veneer have reached the desired height, each intermittent conveyor 11 which comprises the stack platform is operated to carry the stacks to the left onto roller conveyor 12 which carries the stacks to further operations or to storage.

Conveyor belts 2, carrying the veneer from the trimmer and cutting saws, extend a distance under the vacuum conveyor with the top portion thereof close to but spaced downwardly from the receiving ends 13 of the vacuum conveyors sufficiently so that sheet material will pass between belts 2 and the vacuum conveyors. An assisting conveyor belt 14 overlies belts 2 and cooperates therewith. The oncoming veneer sheets are received between belts 2 and 14 and are confined thereby as they are fed between the vacuum conveyor and the extensions of belts 2 thereunder. This serves to flatten the veneer, which are sometimes bowed, and to positively feed the sheets under the vacuum conveyors.

In general, each of the vacuum conveyors comprises a vacuum chamber 20 having an elongated opening 21 extending in the direction of travel of the veneer sheets. The opening 21 is normally closed off by a series of rotating valves which will be discussed in greater detail further on.

Vacuum supply

Vacuum pipes 22 (two for each vacuum conveyor) connect vacuum chamber 20 of each vacuum conveyor with vacuum duct 23 which in turn is connected to a source of vacuum (not shown). Butterfly valve 24 located in duct 23 is operable to partially close off the vacuum chambers 20 from the source of vacuum. Butterfly valve 24 is operated manually by means of valve operator 25 to set it to the desired opening. Operator 25 is adjustably secured at 25' to maintain the desired setting.

The purpose of butterfly valve 24 is to allow regulation of the strength of vacuum applied to the vacuum chamber. The maximum size and weight of the sheets to be handled usually dictates the strength of vacuum necessary. For instance, a common sheet of veneer having the diamensions of $1/8''$ x $8'$ x $4'$ will have an approximate weight of 11.3 pounds and a sufficiently strong vacuum will be required to adequately support this amount of weight. At the same time, the vacuum should be weak enough to be broken quickly to permit a rapid drop when the vacuum is broken at the stacking point. That is, the supplied vacuum should be within the limits of (a) being strong enough to furnish adequate support for the heaviest sheet handled, and (b) being sufficiently weak to permit a rapid drop of the sheet when the vacuum is broken. The desirable vacuum setting may easily be established empirically without determining actual values in terms of inches of water. However, satisfactory results have been obtained for veneer sheets of the dimensions described above with vacuum strengths ranging from 6 inches to 12 inches of water.

It is recommended that a source of vacuum be provided which has considerable excess vacuum capacity over anticipated requirements so that a butterfly valve as hereinbefore described can be used for fine regulation of the vacuum strength. For instance, a Buffalo No. 24 volume fan driven at approximately 28000 r.p.m. by a 10 H.P. 1750 r.p.m. motor has been found very satisfactory to operate two conveyors operated in tandem as shown herein.

However, it is obvious that various other expedients may be used to regulate the vacuum, such as using a variable speed blower as a vacuum source. Also, a constant volume source may be adequate if the sheets handled do not vary to too great extent in size and weight.

Vacuum release

Near the discharge ends 28 of the vacuum conveyors a limit switch 40 is provided. Limit switch 40 is operated by pivotable switch lever 41 normally biased to a position towards the receiving end of the conveyor by a spring or the like where it extends below the vacuum conveyors in the path of the oncoming sheets of veneer. In this position the switch is open. The leading edge of the sheet moves switch lever to a position 41′ to close switch 40 and the lever immediately returns to the open position when the sheet drops from the conveyor.

Figure 3:
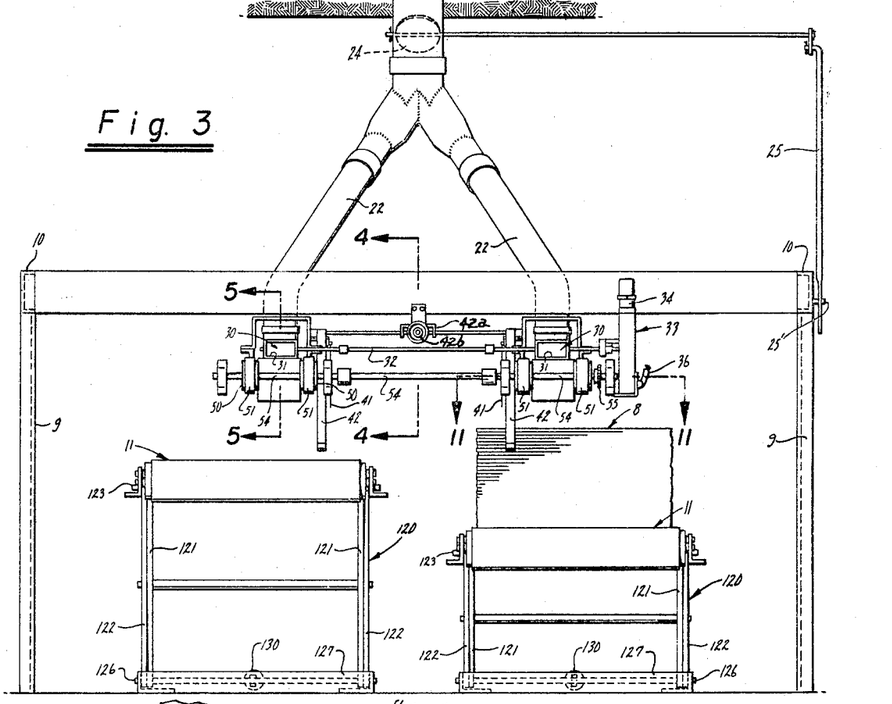
FIGURE 3 is an end elevation of the sheet handling apparatus of FIG. 1 taken along the lines 3—3.
Figure 5:
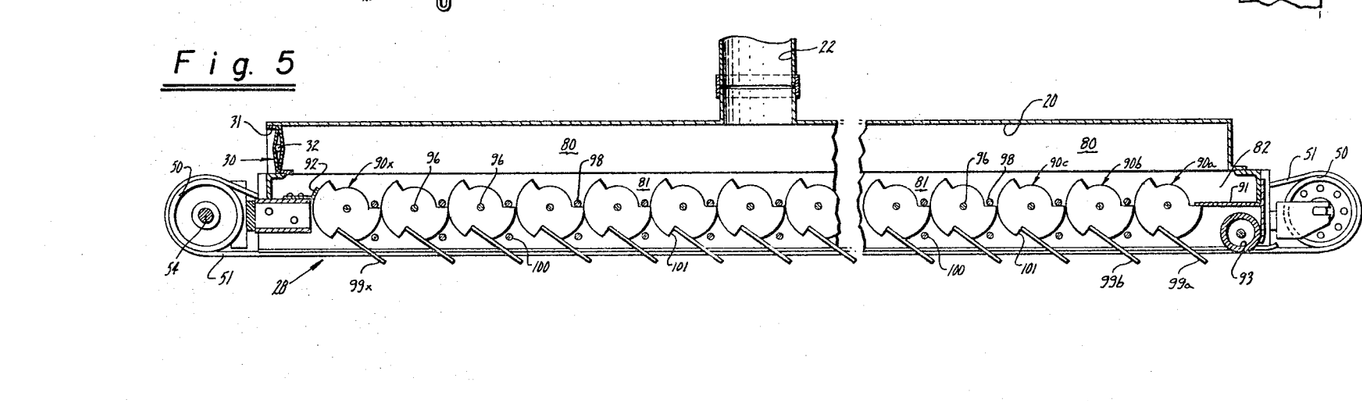
FIGURE 5 is a cross section taken along the lines 5—5 of FIG. 3 showing the interior of the vacuum chamber of the vacuum conveyor.

At the far ends 28 of each of the conveyors a vacuum release valve 30 is provided in an end opening 31 of vacuum chamber 20 (best shown in FIG. 5). Vacuum release valves 30 are butterfly valves pivotally mounted on operating rod 32 which, as shown in FIG. 3, connects vacuum release valves 30 of conveyors 5 and 6 and extends to operator 33. Operator 33 consists of a solenoid 34 and an opposed spring return 34′ (see FIGS. 1 and 3) operable through pivoting mechanism 35 to rotate rod 32 which, in turn, operates vacuum release valves 30.

Solenoid 34 is electrically connected through power line 36 to limit switch 40, from which depends switch lever 41 in the path of the conveyed sheets, through a source of electrical supply (not shown). When switch lever 41 is pivoted towards the discharge ends of the conveyors to close switch 40, solenoid 34 is actuated to open valves 30. But when switch lever 41 is in the normal open position, switch 40 is open so that solenoid 34 is deactivated and spring return 34′ causes valves 30 to remain in their normal closed position.

Thus, as a sheet of veneer passes under the vacuum chamber a vacuum is maintained therein but, when the leading edge of a sheet of veneer reaches and actuates switch lever 41 to the closed position, valves 30 are caused to open, so that air is introduced into vacuum chamber 20 to momentarily reduce the vacuum to drop the sheet of veneer to the stack. Switch 40 may be stationed along the length of the conveyors at a position where it is desirable to have the sheets released and dropped. The longer the sheets, the closer to the discharge ends the switch will be placed.

Plows or stops 42 may be provided to assist discharge of the sheets from the conveyor. They exert a camming effect by virtue of the forward movement of the sheets so that the sheets are positively forced downwards to the stack in addition to the gravitational force causing the sheets to drop and act as an abutment against further forward movement of the sheet.

Also, it may be desirable to mount switch 40 and stops 42 on a movable carriage for movement along the length of the conveyors to make it easier to adjust their positions to accommodate different lengths of sheet material to be handled (see carriage 42a and its trackway 42b).

Sheet moving means

Figure 4:
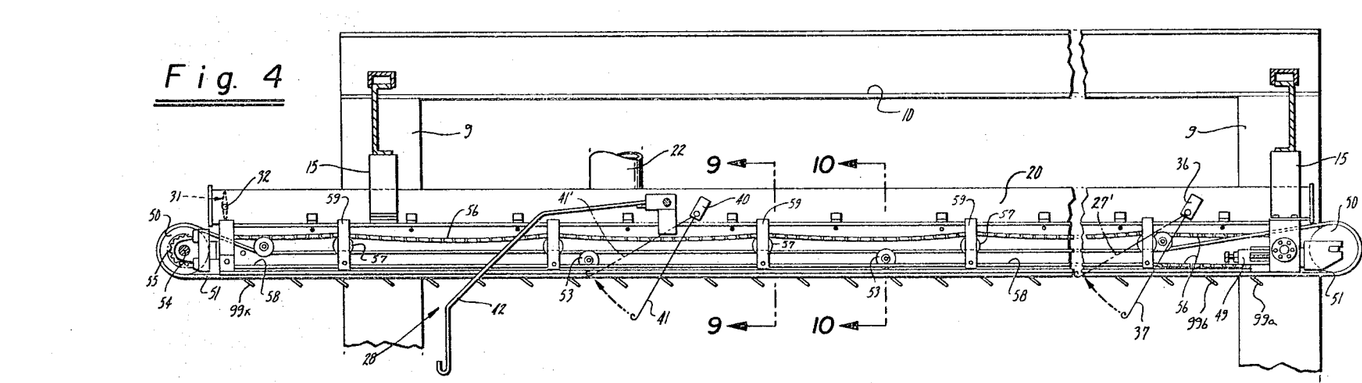
FIGURE 4 is a cross section taken along the lines 4—4 of FIG. 3 showing one of the vacuum conveyors essentially in side elevation.
Figure 9:
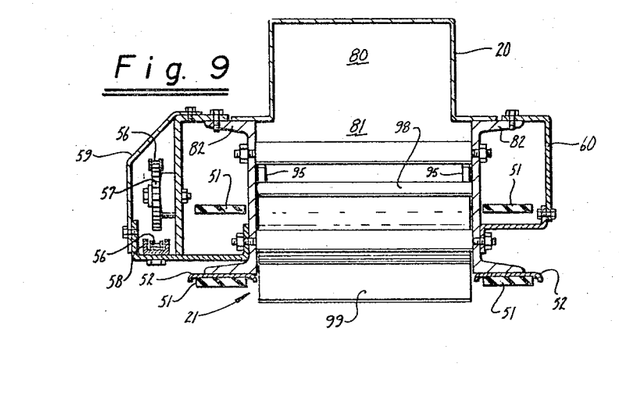
FIGURE 9 is a cross section taken along the lines 9—9 of FIG. 4 showing the vacuum chamber in cross section and showing a drive chain sprocket and guide therefor in a side elevation view.
Figure 10:
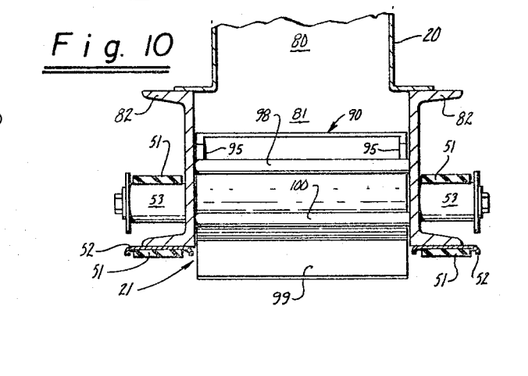
FIGURE 10 is a cross section taken along lines 10—10 of FIG. 4 showing the vacuum conveyor in cross section including the conveyor belts and guides and support pulleys therefor.

Turning now to the construction of the sheet moving means, it is seen in FIG. 4 that vacuum chamber 20 extends the full length of the conveyor. Pairs of pulleys 50 are provided at each end of each conveyor in opposed relationship for mounting endless conveyor belts 51 which extend the length of the conveyors between opposed pulleys. Belts 51 travel in paths parallel to and adjacent opening 21 in each vacuum chamber 20 at each side thereof as best shown in FIGS. 9 and 10. Belt guides 52 confine belts 51 to positions adjacent opening 21 and sealingly engage belts 51. Belts 51 act as "traveling seals" for the sheet material traveling underneath the conveyor exposed to opening 21 of the vacuum chamber. The belts are guided on their return path by means of guide rollers 53 spaced along the conveyor. These rollers also assist in maintaining the proper tension on belts 51.

Pulleys 50 at ends 13 of the conveyors are horizontally adjustable by means of tightening device 49 for adjusting the tension of belts 51.

Figure 11:
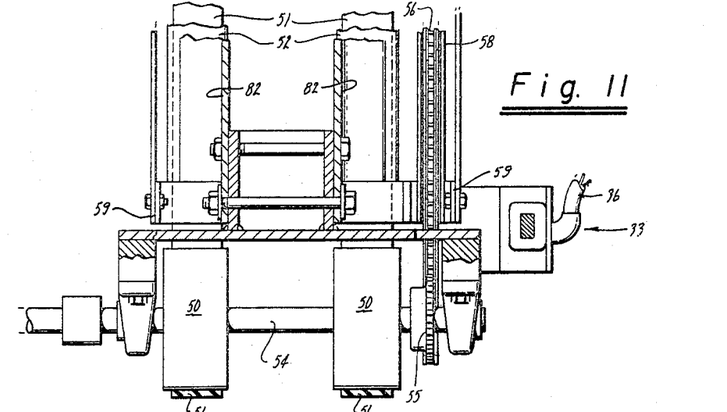
FIGURE 11 is a cross section taken along lines 11—11 of FIG. 3 showing in greater detail the conveyor belt arrangement and chain drive therefor.

At each end of the conveyors, as shown in FIGS. 3 and 11, pulleys 50 are rotatably mounted on a shaft 54 which, in this tandem arrangement, extends between the adjacent conveyors 5 and 6. A sprocket 55 is also mounted on shaft 54 at the discharge end of the conveyor to the outside of one of the conveyors. An endless drive chain 56 is connected between sprocket 55 and the drive for belts 2 of the feed conveyor (not shown). Drive chain 56 is supported at its upper half by a series of support sprockets 57 and at its lower half by a chain trough 58 best seen in FIG. 11. FIG. 9 may be referred to for a more detailed view of the drive chain supporting arrangement. Also shown in this view is chain guard 59 and belt guard 60 for safety purposes.

Conveyor belts 51 are driven by pulleys 50 at the discharge ends of the conveyors which are in turn driven through shaft 54 by drive chain 56. Shaft 54 at the discharge end of the conveyor is driven by chain 56 through sprocket 55. In this manner, belts 51 are driven at the same speed as belts 2.

Other expedients may be used to drive belts 51, the only criteria being that their speed should closely approximate the speed of the feeding conveyor belts 2 for efficient operation since too great a speed differential may cause buckling of the conveyed material. For instance, belts 51 may be driven through frictional contact with belts 2 where they overlap each other. Alternatively, either shaft 54 may be driven directly by a suitable motor.

Vacuum chamber construction

Figure 8:
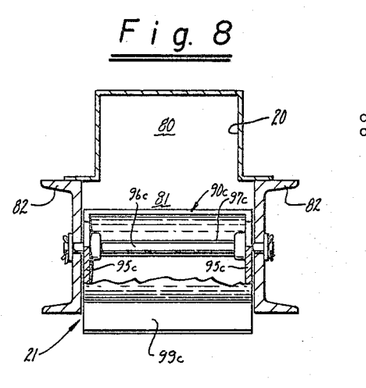
FIGURE 8 is a cross section taken along the lines 8—8 of FIG. 6 showing the vacuum chamber and a rotating valve herein in greater detail.

Turning now from the sheet moving means to the construction of the vacuum chamber, reference is made to FIGS. 5 and 8 wherein it is seen that vacuum chamber 20 comprises an upper plenum chamber 80 and a lower valved section 81 defined by opposed channel members 82, the top flanges of which are sealingly connected to plenum chamber 80. The lower flanges of channel members 82 provided support for belt guides 52.

As seen in FIG. 5, lower valved section 81 contains a series of adjacent rotatable valve closures 90a through $x$ (each valve and its component parts being indicated with the same identifying letter), which normally co-operate to close off opening 21, extending along the bottom thereof between conveyor belts 51. Valve 90a closes at its forward end against extension wall 91 to provide an end seal with the end wall of vacuum chamber 80. Similarly, valve 90x at end 28 sealingly engages wall extension 92 to provide an end seal with vacuum chamber 80 at that end. Wall 92 is in sliding contact with rotating valve 90x so that a seal is maintained even when valve 90x has rotated to the open position.

A sealing roller 93 at end 13 is provided to create a rolling seal with the sheet moving under the conveyor. A wall extension 94 extending from the end wall of vacuum chamber 20 is in contact with sealing roll 93 to provide a moving seal therebetween so that, when sheet material is beneath sealing roll 93, a continuous end seal is formed extending between the sheet and the end wall of vacuum chamber 20.

Valve construction

Figure 6:
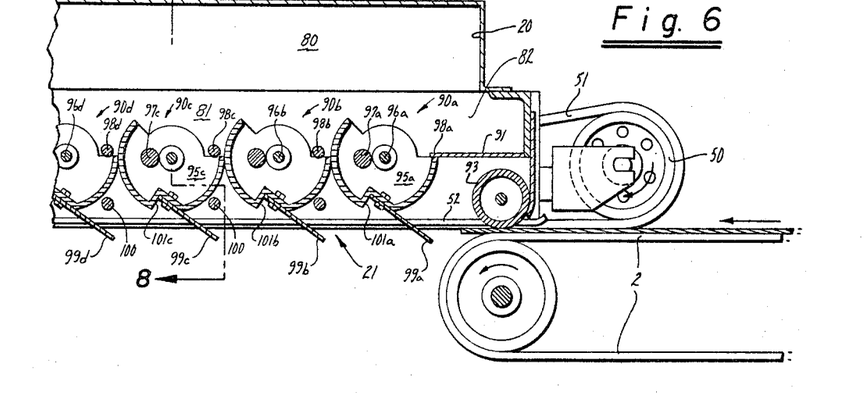
FIGURE 6 is a fragmentary close-up view of the right end of the interior of the vacuum conveyor as shown in FIG. 5 showing the rotating valves in greater detail and showing a sheet of veneer advancing underneath the conveyor.
Figure 7:
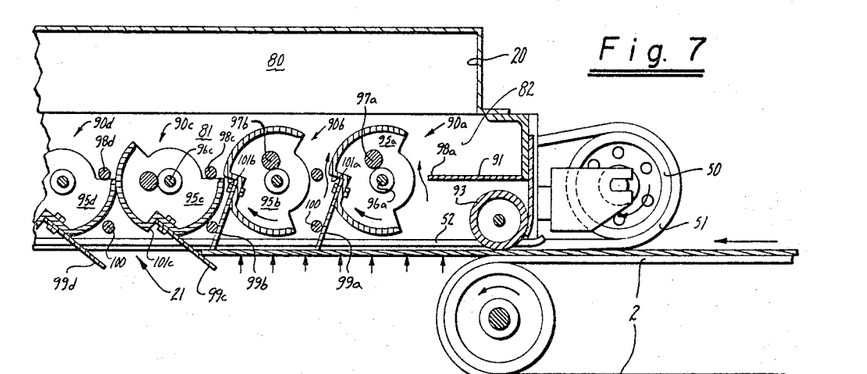
FIGURE 7 corresponds to the view of the interior of the conveyor of FIG. 6 showing the rotating valves in greater detail and showing the sheet of veneer advanced a distance underneath the conveyor with the valves located thereover rotated to the open position.

Referring now to FIGS. 6, 7 and 8 for a detailed description of valves 90a–x, each valve has a cylindrical portion with an upwardly facing segmental portion thereof removed. The axis of the cylindrical portion extends horizontally across the lower valved section of vacuum chamber 20, perpendicular to the side walls thereof. Each valve has side panels 95a–x integrally formed with the cylindrical portion and of circular shape. Side panels 95a–x are each located closely adjacent the inner walls of channels 82 so as to close off the entire area between the channels. The valves are rotatably supported by channnels 82 by means of pivot pins 96a–x secured to channels 82 and rotatably engaging end panels 95a–x of the valves at the axis of the cylindrical portion thereof.

Valves 90a–x are normally biased in a counter-clockwise direction to the closed position about pivot points 96a–x by means of counterweights 97a–x. Pivot stops 98a–x are provided as detents to further rotational movement of the valves in a counter-clockwise direction beyond the closed position. Appropriate recesses are provided in end panels 95a–x for clearance of pivot stops 98a–x, stops 98a–x acting against the valve end walls at the end of the recesses to prevent further rotary motion.

Each valve is situated so that its rotary path is very close to the rotary path of the next succeeding valve, so that at all times during the rotation of each valve from the closed to the open position, a seal is maintained between it and the next succeeding valve.

Referring now to FIG. 7 particularly, valves 90a and 90b are shown fully rotated to their open positions. Rotation of the valves to the open position is effected by the leading edge of the veneer sheet V as it moves forward under the conveyor, acting against valve blades 99a–x, one of which is secured to each of valves 90a–x in a position, when the valves are in the closed position, so that they extend downwardly in the path of sheet material being conveyed under the conveyor. Valve blades 99a–x are each consecutively moved by the leading edge of the veneer until they have rotated to a clockwise position clear of the path of the veneer. This position is illustrated by valves 90a and 90b in FIG. 7. Blade rotation stops 100 are provided to prevent further rotation of valves 90a–x beyond the open position. In the open position, valves 90a–x have been rotated so that the open segment of their cylindrical portions face to the right, adjacent the preceding valve, providing a channel-like opening between the valves to permit the vacuum in chamber 80 to communicate to the bottom of vacuum chamber 20. In this position, valve flaps 99a–x each act as a well so that consecutive individual vacuum chambers are defined by adjacent valve flaps, the structurela channels 82 and the sheet of material riding along against the ends of flaps 99a–x held thereto by the vacuum in the chambers so defined.

The cylindrical portion of each valve 90a–x has an indentation at 101a–x which, when the valve is rotated to the open position, is adjacent the edge of the open segment of the cylindrical portion of the next succeeding valve when it is in the closed position (as at 101b in FIG. 7). The purpose of this recess or indentation is to provide a substantial opening between it and the next succeeding valve immediately upon rotation of the succeeding valve a short distance. This permits more rapid evacuation of the chamber defined between the blades of the two valves and the leading edge of the veneer.

Stacker operation

The operation of the vacuum stacker may be generally described as follows. A sheet of veneer or other material is fed forwardly under the vacuum conveyor by feeding conveyor belts 2 as shown in FIG. 6. The sheet rollingly contacts sealing roll 93 to provide a seal between the sheet and the rear wall 94 of the conveyor. The sheet also is held upwardly against moving belts 51 by belts 2 to provide seals between the sheets and the side walls of the vacuum chamber 20. The leading edge of the sheet first strikes valve blade 99a to cause valve 90a to rotate to the open position and at the same time to create a forward seal between the leading edge of the veneer and blade 99a so that a vacuum chamber is formed. After the leading edge of the sheet fully rotates valve 90a to the open position, the sheet moves forward on belts 51 to open each successive valve in the same manner and to create a series of successive vacuum chambers above the sheet in the same fashion. FIG. 7 shows the sheet moved in this manner beyond valves 90a and 90b and in position to open valve 90c.

If the trailing edge of the sheet passes beyond any of the valves before the vacuum in vacuum chamber 20 is released, they will rotate back to the closed position to which they are biased by counterweights 97a–x so that no air leakage occurs between the valves after the sheet has passed.

Thus supported by the vacuum chambers, the sheet moves onward until it actuates switch 40 (through switch lever 41) to open vacuum release valve 30 to break the vacuum in vacuum chamber 20, thereby causing the sheet to drop to the stack.

Upon release of the sheet, the valves above the sheet rotate by means of their counterweights back to the closed position ready to receive the next sheet.

Stack platform

When stacking fragile material such as veneer, it is desirable that the sheets drop only a short distance to minimize breakage. Limiting free fall to a short distance also increases stacking accuracy since sheets tend to fall erratically even when uniformly released. For these reasons a vertically adjustable platform is used which may be controlled to hold the top of the forming stacks 7 and 8 within a prescribed distance of the bottoms of conveyors 5 and 6.

The vertically adjustable platform is provided in the form of intermittent conveyors 11 mounted on scissors lifts 120. Scissor members 121 and 122 have pivots 123 and 124, respectively, supportingly connecting them with conveyor 11 and pivots 125 and 126, respectively, supportingly connecting them with floor bracket 127. Pivots 124 and 125 are free to move laterally in slots 128 and 129 to allow operation of the scissors with conveyor 11 maintained parallel with the floor at all times. Hydraulic piston 130 operates laterally against scissor members 125 at pivot 125 to operate the scissors lift.

Pump P is provided to continuously pump hydraulic fluid from reservoir R into the connecting line L to piston 130. Valve $V_1$ interposed in line L is manually opened to operate piston 130 to move the stack platform vertically to its uppermost position for the start of the stacking operation and it is then closed.

Figure 13:
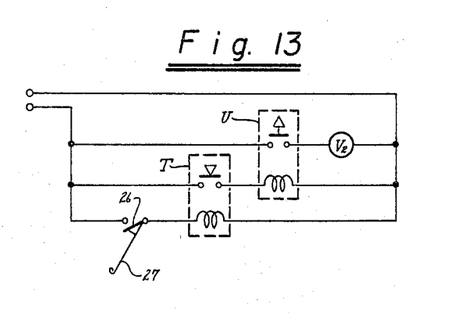
FIGURE 13 is a schematic view of the operating circuit for the scissors lift for the stack platform.

The uppermost position of the platform is somewhat below the lever arm 27 of a switch 26 which is positioned in the path of the sheet material moving under the conveyor. As the stack of sheet material builds up on the platform, the platform is automatically lowered in a gradual manner as described below with reference to FIG. 13 illustrating the electric control of the scissors lift.

Relief valve $V_2$ in line L to piston 130 is a solenoid valve, electrically operated through a time delay circuit by the closing of switch 26. Switch 26 closes when lever 27 is moved upwardly to position 27', to operate a time delay relay T which in turn operates a relay U. Relay T has a time lag before closing of sufficient duration that it does not close during the temporary period when each sheet passing under the conveyors operates switch 26 to the closed position. However, when the stack has built upwardly to a point where it constantly holds switch lever 27 to position 27', relay T will operate to close relay U which in turn opens solenoid valve $V_2$ to release hydraulic fluid from piston 130 to lower scissors lift 120 and, in turn, conveyor 11.

Conveyor 11 and the stack with it will continue dropping until the stack clears switch lever 27 and switch 26 is again opened. Relay U is a delayed opening type so that there is a short interval after switch 26 is opened (and consequently relay T) before relay U opens, during which the platform continues its downward movement a preselected distance. When, after this delay, relay U opens, the solenoid of valve $V_2$ is de-energized to again close the valve and stop the downward movement of the platform.

Each time the stack builds up until it closes switch 26 the above cycle is automatically repeated. When the stack has reached the desired height, conveyor 11 will reach a lowered position where it may be operated to move the stack off onto roller conveyor 12. Valve $V_1$ is again opened to move the platform back up to its uppermost position to start a new stack.

*Alternate valve construction*

Figure 12:
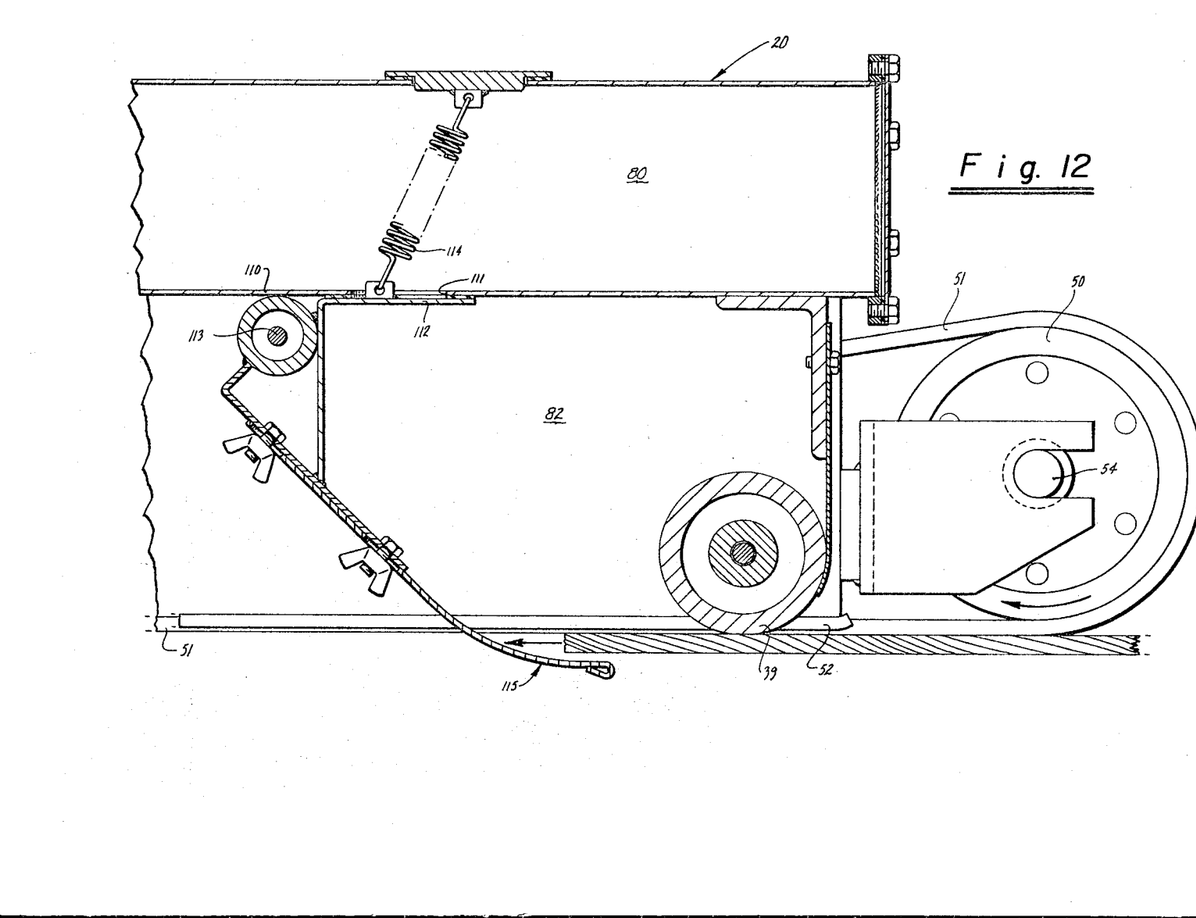
FIGURE 12 is a fragmentary cross sectional view corresponding to the view of FIG. 6 of an alternative form for the rotating valves.

The valving arrangement may take an alternate form as shown in FIG. 12. In this form upper plenum chamber 80 is separated from the lower valved chamber by means of a wall 110 having a series of consecutive valved openings 111 therein. Valve closures 112, pivotable around a pivot 113, are normally biased to close off valve openings 111 by means of springs 114. Pivots 113 extend horizontally between channels 82 and are secured to channels 82 at their outer ends.

Valve flaps 115 are provided to actuate valves 112 by pivoting them to the open position when the leading edge of the sheet traveling under the conveyor strikes the portion of the flaps extending beneath the vacuum chamber. As in the case of the previously described valves 90, valves 112 are rotated to a position such that valve flaps 115 move forward and upward out of confrontation with the leading edge of the sheet. Also, as in the previously described valves, the valve flaps provide consecutive walls to define vacuum chambers therebetween. When the sheet has passed the valves or has dropped from the conveyor upon release of the vacuum by opening of vacuum release valve 30, valves 112 are free to return to the closed position, blocking off the vacuum to the lower conveyor section in readiness for receiving the next sheet.

In the above-described valve construction, each valve is separated from the adjacent valves by interposed stationary baffles (which form wall 110) to close off the space between them so that the entire vacuum chamber is closed off from the outside. In the first-described and preferred valve construction, each valve is immediately adjacent the next succeeding valve and forms a "sealing wall" for it. It is also within the purview of this invention to space these individual valves apart and interpose stationary baffle to close off the space between them. Such baffles may take a form similar to baffle 91 which acts as a "sealing wall" between the receiving end of the vacuum chamber and the first valve, 90a. For some applications, particularly where the material conveyed is very light, it may be desirable to employ only a single valve of the nature described, closing off the rest of the vacuum chamber by means of the aforementioned baffles.

*Other embodiments*

The main advantages of the arrangement of two conveyors in tandem as described in the preferred embodiment are that material of exceptionally large widths may be handled and large ranges of sheet widths may be accommodated with practically no change in design since wide sheets may be supported at two points along their widths between the two conveyors. In addition, each conveyor can independently handle a single sheet at the same time by the provision of independently operating vacuum release means. However, it should be clear that one conveyor may be used entirely independently without a tandem arrangement.

In the preferred embodiments a multiplicity of sheet actuated valves are used to close off the vacuum chamber opening. In contrast, if desired, a single valve may be used for the entire opening, although this is not too practical except for conveying or stacking sheets which are quite short in the direction of travel.

Also in the preferred embodiments the conveyors of this invention are employed for a stacking operation. It is to be understood that they may also be used as conveyors for feeding a subsequent conveyor in parallel therewith by removal of the limit switch and the stops.

While the invention has been described by reference to the embodiments illustrated and described, it will be apparent to those skilled in the art that modifications thereof may be made without departing from the scope of the invention related herein.

What is claimed is:

1. Apparatus for conveying sheet material in a path of travel comprising a vacuum chamber having a downwardly facing opening, said opening being superjacent to and extending along said path of travel, vacuum imparting means in communication with said vacuum chamber, means for conveying said sheet material along said path, a series of adjacent, rotary valves disposed along said opening in the direction of travel and normally closing off said opening, each of said valves being mounted with its axis of rotation perpendicular to the path of the conveyed sheet material and each being normally biased to a closed position, and a flap attached to each valve extending across said opening and downwardly into said sheet material path when the valve to which it is connected is in the closed position, each of said flaps being movable with its valve to a position out of said path into said opening with the forward edge thereof at said opening when its valve is rotated to the open position, whereby, when sheet material is moved adjacent to each of said valves, each valve is opened by the sheet material acting against the flap therefor and the forward edge of each of said flaps creates a partition between each of said valves, thereby to create separate zones of reduced pressure on the side of the sheet adjacent said opening to hold the moving sheet material thereto.

2. Apparatus for conveying sheets consecutively in a path of travel and stacking them comprising a vacuum chamber having a series of downwardly facing openings along and superjacent said path of travel, vacuum imparting means in communication with said vacuum chamber, means for propelling sheets consecutively subjacent said openings and along said path of travel, valves disposed in said openings and biased to a closed position to normally close off said openings, means associated with each valve for sealing its opening against adjacent sheet material and for selectively opening it including means extending into the path of travel of the sheets to also seal the leading edge of the sheets, said associated means being operated independently of the next succeeding valve, said sealing and opening means in turn being operable by each consecutive sheet moving in said path to expose each of said openings superjacent such sheet, whereby, to create zones of reduced pressure on the side of the sheet adjacent said openings to hold the moving sheet to said openings, and means operable by each consecutive sheet, when it reaches a preselected stack forming position, to momentarily diminish the vacuum in said vacuum chamber, whereby, to drop it to the stack forming therebelow.

3. Apparatus for conveying sheet material in a path of travel comprising a vacuum chamber having a series of openings along and adjacent to said path of travel, vacuum imparting means in communication with said vacuum chamber, means for introducing sheet material into said travel path, means disposed along the sides of said openings and extending along said path of travel for conveying said sheet material along said path and for sealing said sides against the sheet material conveyed adjacent thereto, valves disposed in said openings and biased to a closed position to normally close said openings and partitioning and operating means associated with each valve and disposed between the opening therefor and the next succeeding opening to form a partition therebetween with a moving seal against the leading edge sheet material moving adjacent thereto, each said partitioning and operating means being operable by the sheet material moving in said path valve, to expose portions of said opening adjacent said sheet material while said sheet material is adjacent thereto, whereby, to creates zones of reduced pressure along the side of the sheet material adjacent said opening to hold the moving sheet material to said opening so long as it is adjacent said opening.

4. Apparatus for conveying sheets in a path of travel and stacking them comprising a vacuum chamber having a downwardly facing opening superjacent said path of travel, vacuum imparting means in communication with said vacuum chamber, means for introducing successive sheets subjacent one end of the vacuum chamber into said travel path, means for propelling said sheets along said travel path and sealing the sides of said opening against the sheet material conveyed, a series of valves disposed along said opening in the direction of travel and each biased to a closed position to normally close off a portion thereof, each of said valves having operating and partitioning means extending below said opening into said travel path, each of said operating and partitioning means in turn being movable by said sheets out of said travel path to open its associated valve to thus expose its opening to the sheet moving subjacent thereto, and each of said operating and partitioning means being disposed between said opening and the next succeeding opening and forming a partition therebetween with a moving seal against the leading edge of the sheet moving therebelow, and means for momentarily reducing the vacuum in said vacuum chamber when a sheet reaches a predetermined position to release the sheet to a stack being formed below.

5. Apparatus as in claim 4 and wherein said means for momentarily reducing the vacuum in said vacuum chamber comprises a limit switch having an operator extending in said travel path and operable by the leading edge of each consecutive sheet, said switch being positioned at a point along said travel path preselected as the forward end of stack to be formed below, a normally closed vacuum release valve connecting said vacuum chamber to the atmosphere and means responsive to the operation of said switch for operating said valve momentarily to the open position.

6. Apparatus as in claim 4 and including a stop extending in said travel path at a point therealong corresponding to the forward end of the stack to be formed below, said stop acting to arrest forward movement of each consecutive sheet coincident with the release of each sheet.

7. Apparatus for conveying sheet material in a path of travel comprising a vacuum chamber having at least one opening therein adjacent and along said path of travel, vacuum imparting means in communication with said vacuum chamber, means for conveying said sheet material along said path, a valve disposed in each opening and biased to a closed position to normally close off said opening, means for sealing said opening against adjacent sheet material in the travel path including a flap pivotably mounted about an axis generally perpendicular to said travel path normally extending from said axis into said path to seal the leading edge of said material, said flap being operatingly connected to the valve for said opening and being pivotable in the direction of sheet conveyance by conveyed sheet material to a position immediately adjacent said path to operate said valve to the open position so long as the flap is held out of the path by the sheet material, whereby, when sheet material is moved adjacent said valve, it is opened by the sheet material acting against the flap connected to said valve and said flap creates a seal against said sheet during its passage adjacent said valve, thereby to create a zone of reduced pressure on the side of the sheet adjacent said opening to hold the moving sheet material thereto.

8. A vacuum conveyor having a vacuum chamber with at least one downwardly facing valved opening, subjacent which sheet material is conveyed along a path of travel, the valve for said opening being rotatably mounted therein with the axis of rotation perpendicular to the path of sheet travel, said valve having a closed position and a rotated open position and means biasing it about said axis in a direction opposed to the direction of sheet travel to said closed position, and means for sealing said opening against adjacent sheet material including a flap connected to said valve and extending in the path of sheet travel when the valve is in the closed position and operable by the sheet material to move out of said path and rotate said valve to and hold it at said open position and to seal the leading edge of the sheet while the sheet moves adjacent said valve.

References Cited by the Examiner

UNITED STATES PATENTS

| | | | |
|---|---|---|---|
| 1,598,766 | 9/1926 | Fox. | |
| 2,973,960 | 3/1961 | Buccicone | 271—74 |
| 3,001,789 | 9/1961 | Emslie et al. | 214—7 |
| 3,059,787 | 10/1962 | Forsyth. | |
| 3,129,825 | 4/1964 | Lamb. | |
| 3,155,387 | 11/1964 | Buccicone | 198—180 |
| 3,168,958 | 2/1965 | Crossi | 214—309 |
| 3,202,302 | 9/1965 | Insolio. | |

FOREIGN PATENTS 1,085,467    7/1960    Germany.

GERALD M. FORLENZA, *Primary Examiner.*

MORRIS TEMIN, *Examiner.*

M. WOLSON, R. JOHNSON, *Assistant Examiners.*